United States Patent
Berendsen et al.

(10) Patent No.: US 8,806,100 B1
(45) Date of Patent: Aug. 12, 2014

(54) SYNCHRONIZING MULTIPLE USB CONTROLLERS TO REDUCE POWER

(75) Inventors: John Berendsen, Beaconsfield (CA); Robert Chapman, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2089 days.

(21) Appl. No.: 11/613,874

(22) Filed: Dec. 20, 2006

(51) Int. Cl.
*G06F 13/00* (2006.01)

(52) U.S. Cl.
USPC ............ 710/107; 710/305; 710/313; 713/320

(58) Field of Classification Search
USPC .......... 710/107, 305, 306, 313; 713/320, 323, 713/324
See application file for complete search history.

(56) References Cited

U.S. PATENT DOCUMENTS

2006/0294274 A1* 12/2006 Bennett .......................... 710/100
2007/0233909 A1* 10/2007 Derr et al. ........................ 710/36

* cited by examiner

*Primary Examiner* — Glenn A Auve
(74) *Attorney, Agent, or Firm* — Kilpatrick Townsend & Stockton LLP

(57) ABSTRACT

Circuits, methods, and apparatus that reduce the power consumed by transactions initiated by a number of USB host controllers. Peripheral devices on a number of USB networks are accessed in a coordinated manner in order to reduce power dissipated by a CPU and other circuits when reading data needed by the host controllers. The resulting memory reads are temporally clustered. This allows the CPU to process a greater number of requests each time it leaves a low-power state. As a result, the CPU may possibly remain in a sleep state for a longer period of time, thus saving power. This is accomplished at the host controller level by synchronizing the time frames used by each host controller in a system. The synchronizing signal may be one or more bits of a frame count provided by one host controller to a number of other frame controllers.

20 Claims, 20 Drawing Sheets

SYNCHRONIZING MULTIPLE USB CONTROLLERS TO REDUCE POWER

CROSS-REFERENCES TO RELATED APPLICATIONS

This application is related to co-owned and co-pending U.S. patent application Ser. No. 11/613,845, titled "Reducing System Power Consumption Due to USB Host Controllers," by Berendsen et al, which is hereby incorporated by reference.

BACKGROUND

The present invention relates generally to USB networking, and more specifically to reducing the power consumed by data transfers initiated by a number of USB host controllers.

Universal Serial Bus (USB) networks have become the most popular paths for data transmission between computers and peripheral devices. Specifically, USB networks are used as personal-area wired networks to transfer data between a desktop, notebook or other computer system and devices such as printers, scanners, cameras, speakers, mice, keyboards, and hard disks. Computers typically have several USB ports, which operate under the direction of a number of host controllers. Each port may be extended further using one or more hubs. The original USB concept envisioned many devices daisy chained to one USB port. In practice USB ports have become so ubiquitous that often no more than one device is connected to each port.

Currently, the USB2 standard has become very popular, replacing the USB1 standard, with which it is backward compatible. USB2 supports data transfer rates of 480 Mb/s, the so called "high speed" rate, while USB1 supports 12 Mb/s, "full speed" and 1.5 Mb/s, "low speed" rates. Typically, peripheral devices such as mice and keyboards operate at a lower speed to reduce component costs, while higher bandwidth devices, such as camcorders, operate at the high speed.

These peripheral devices operate as slave devices on the USB bus. That is, they must be queried by the USB host controller as to whether they have data to provide. For example, a mouse is periodically asked by the USB controller whether it has been moved. In order to ask the mouse whether it has moved, the USB controller need to read data, such as a bus address, from a system memory. These memory reads consume power, particularly when one or more devices needs to be woken from a low power or sleep state. Also, reading data from a memory generates voltage transitions at device pins and board traces. These transitions appear across various stray capacitances, thus they generate currents, which causes power to be dissipated.

This power dissipation is undesirable, particularly in battery powered devices, such as laptop computers. Thus, what is needed are circuits, methods, and apparatus that reduce the power consumed by these memory reads.

SUMMARY

Accordingly, embodiments of the present invention provide circuits, methods, and apparatus that reduce the power consumed by data transactions initiated by a number of USB host controllers.

Each time that a USB host controller accesses a peripheral device, also known as a function or endpoint, the USB host controller requires information for the device. This information is stored in a system memory. The host controller provides a read request to a CPU for this information. Unfortunately, if the system is in a low-power or sleep state, the system must wake from the sleep state to process the read request. Where several USB ports are controlled by several USB controllers, the system may be repeatedly woken by memory read requests. In a specific example, the CPU is in a low power state and must enter a higher power mode to examine the request for a match with data held in the CPU data cache. Accordingly, embodiments of the present invention temporally cluster these memory reads. This allows the CPU to process a greater number of requests each time it leaves a low-power state. As a result, the system may possibly remain in a sleep state for a longer period of time, thus saving power.

An exemplary embodiment of the present invention temporally clusters memory reads initiated by a number of host memory controllers. This is accomplished at the host controller level by synchronizing the time frames used by each host controller in a system.

Specifically, in a system with several host controller interfaces, a frame count signal from one host controller interface is used to time frame counters in other host controller interfaces. In this way, the frames for each USB bus are aligned. This is true no matter the types of host controllers are used, since the currently used USB interfaces, specifically universal host controller interfaces (UHCI), enhanced host controller interfaces (EHCI), and open host controller interfaces (OHCI), each use a 1 ms frame time. Once the frames are aligned, associated memory reads tend to be grouped or clustered near the start of each frame, instead of being randomly distributed. Accordingly, depending on other conditions, the system may be able to remain in a low-power state for longer periods of time, thus reducing system power dissipation.

Another embodiment of the present invention does not access any USB devices during some frames. This is outlined in co-owned and co-pending U.S. patent application Ser. No. 11/613,845, titled "Reducing System Power Consumption Due to USB Host Controllers," by Berendsen et al, which is hereby incorporated by reference. That is, during some frames, no accesses are made to devices on any bus. Thus, the host controllers do not need to initiate memory reads during those frames.

Specifically, in a system with several host controllers, a first host controller provides a frame count, or a portion of a frame count, to each of the other host controllers. For example, the first host controller may provide a number of least-significant bits (LSBs) of the frame count to the other host controllers. When the system is initialized, the first host controller receives a start command from a host controller driver and begins counting frames and transferring data. The other host controllers also receive start commands from their drivers, and these may occur before or after the first host controller receives its start command. Instead of beginning at this time, the other host controllers compare the LSBs of their frame counters to the LSBs received from the first frame counter. When there is a match (and after the first host controller has begun counting) the other host controllers then become active, counting frames and transferring data.

In this way, the LSBs for each host controller frame counters have matching values. Thus, they can be instructed to access devices on their buses only during some frame counts and not others, and the accesses will occur in a synchronized manner, instead of being distributed among several frames. For example, a specific embodiment of the present invention accesses data only once every 32 frames. The host controllers are instructed to access devices, that is to traverse their schedules, only when the five LSBs are each zero. A first host controller provides the five LSBs to the other controllers.

When a count is reached where the five LSBs are zero, that is, the remainder of the count modulo 32 is zero, the host controllers each access their buses, and the memory reads initiated by this are temporally clustered.

Various embodiments of the present invention may incorporate these and the other features described herein. A better understanding of the nature and advantages of the present invention may be gained by reference to the following detailed description and the accompanying drawings.

BRIEF DESCRIPTION OF THE DRAWINGS

FIG. 3A is a block diagram of a Southbridge circuit that incorporates an embodiment of the present invention, while

DESCRIPTION OF EXEMPLARY EMBODIMENTS

Figure 1:
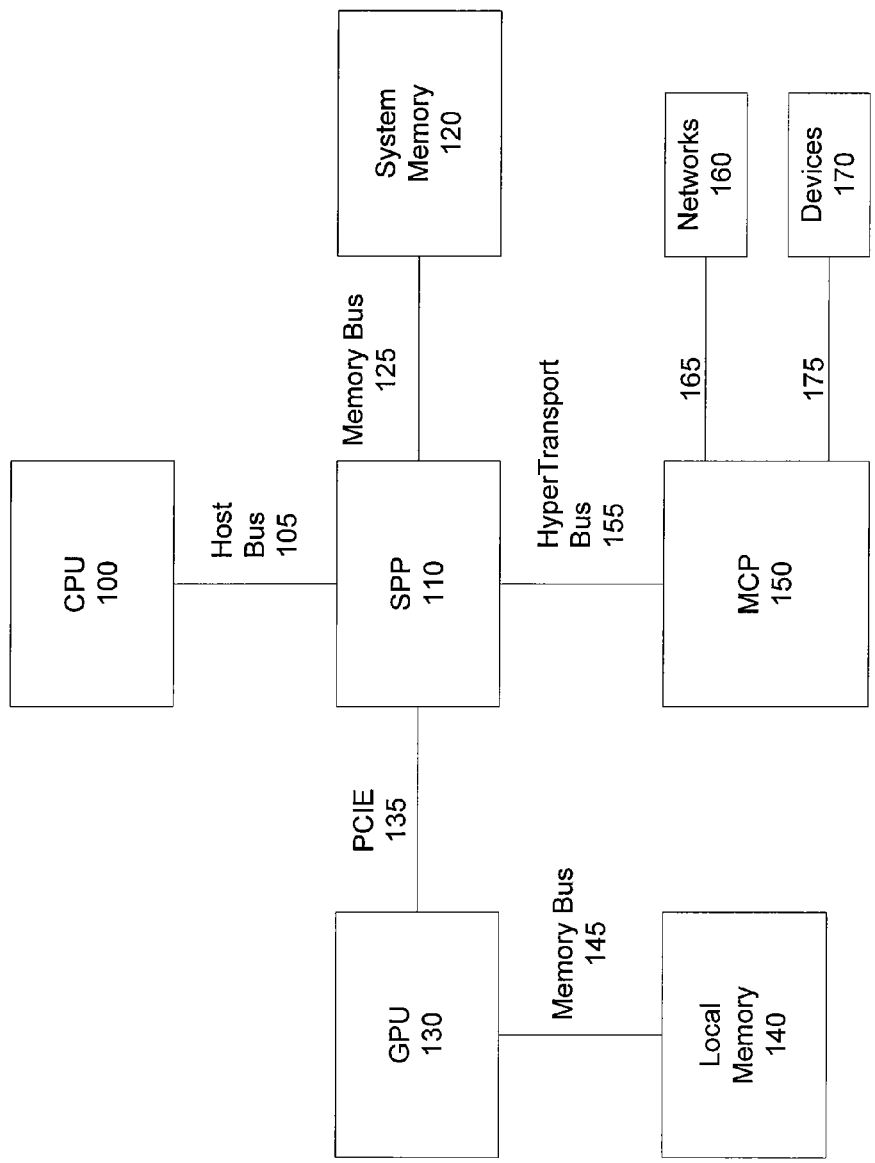
FIG. 1 is a block diagram of a computing system that is improved by incorporating an embodiment of the present invention.

FIG. 1 is a block diagram of a computing system that is improved by incorporating an embodiment of the present invention. This block diagram includes a central processing unit (CPU) or host processor 100, system platform processor (SPP) 110, system memory 120, graphics processing unit (GPU) 130, local memory 140, media communications processor (MCP) 150, networks 160, and internal and peripheral devices 170.

The CPU 100 connects to the SPP 110 over the host bus 105. The SPP 110 is in communication with the graphics processing unit 130 over a PCIE connection 135. The SPP 110 reads and writes data to and from the system memory 120 over the memory bus 125. The MCP 150 communicates with the SPP 110 via a high-speed connection, such as a HyperTransport bus 155, and connects network 160 and internal and peripheral devices 170 to the remainder of the computer system. The graphics processing unit 130 receives data over the PCIE connection 135 and generates graphic and video images for display over a monitor or other display device (not shown). The graphics processing unit 130 stores fragment and other graphics data in the local memory 140.

The CPU 100 may be a processor, such as those manufactured by Intel Corporation or other supplier, and is well-known by those skilled in the art. The SPP 110 and MCP 150 are commonly referred to as a chipset, and each is typically an integrated circuit. These may alternately be Northbridge and Southbridge devices. The system memory 120 is often a number of dynamic random access memory devices arranged in dual in-line memory modules (DIMMs). The graphics processing unit 130, SPP 110, and MCP 150 are preferably manufactured by NVIDIA Corporation.

The graphics processing unit 130 and local memory 140 may be located on a daughter board or graphics card, while the CPU 100, system platform processor 110, system memory 120, and media communications processor 150 may be located on a computer system motherboard. The graphics card is typically a printed-circuit board with the graphics processing unit 130 and local memory 140 attached. The printed-circuit board typically includes a connector, for example, a PCIE connector attached to the printed-circuit board that fits into a PCIE slot included on the motherboard.

While this embodiment provides a specific type computer system that may be improved by the incorporation of an embodiment of the present invention, other types of electronic or computer systems may also be improved. For example, video and other game systems, navigation, set-top boxes, pachinko machines, and other types of electronic systems may be improved by the incorporation of embodiments of the present invention.

Also, while these types of computer systems, and the other electronic systems described herein, are presently commonplace, other types of computer and electronic systems are currently being developed, and others will be developed in the future. It is expected that many of these may also be improved by the incorporation of embodiments of the present invention. Accordingly, the specific examples listed are explanatory in nature and do not limit either the possible embodiments of the present invention or the claims.

Figure 2:
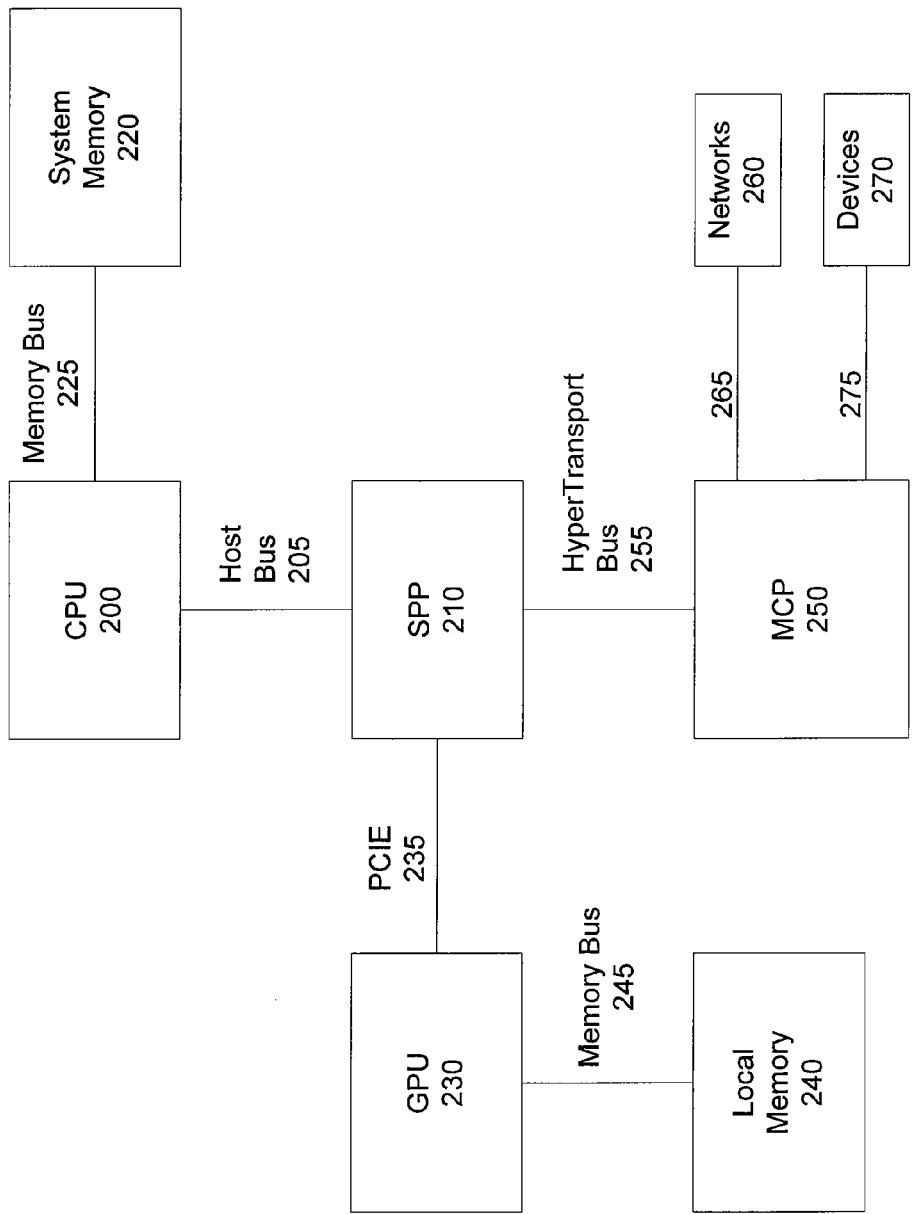
FIG. 2 is a block diagram of another computing system that is improved by incorporating an embodiment of the present invention.

FIG. 2 is a block diagram of another computing system that is improved by incorporating an embodiment of the present invention. This block diagram includes a central processing unit or host processor 200, SPP 210, system memory 220, graphics processing unit 230, MCP 250, networks 260, and internal and peripheral devices 270. A frame buffer, local, or graphics memory 240 is included.

The CPU 200 communicates with the SPP 210 via the host bus 205 and accesses the system memory 220 via the memory bus 225. The GPU 230 communicates with the SPP 210 over the PCIE bus 235 and the local memory 240 over memory bus 245. The MCP 250 communicates with the SPP 210 via a high-speed connection such as a HyperTransport bus 255, and connects network 260 and internal and peripheral devices 270 to the remainder of the computer system.

As before, the central processing unit or host processor 200 may be one of the central processing units manufactured by Intel Corporation or other supplier and are well-known by those skilled in the art. The graphics processor 230, integrated graphics processor 210, and media and communications processor 240 are preferably provided by NVIDIA Corporation.

Figure 3A:
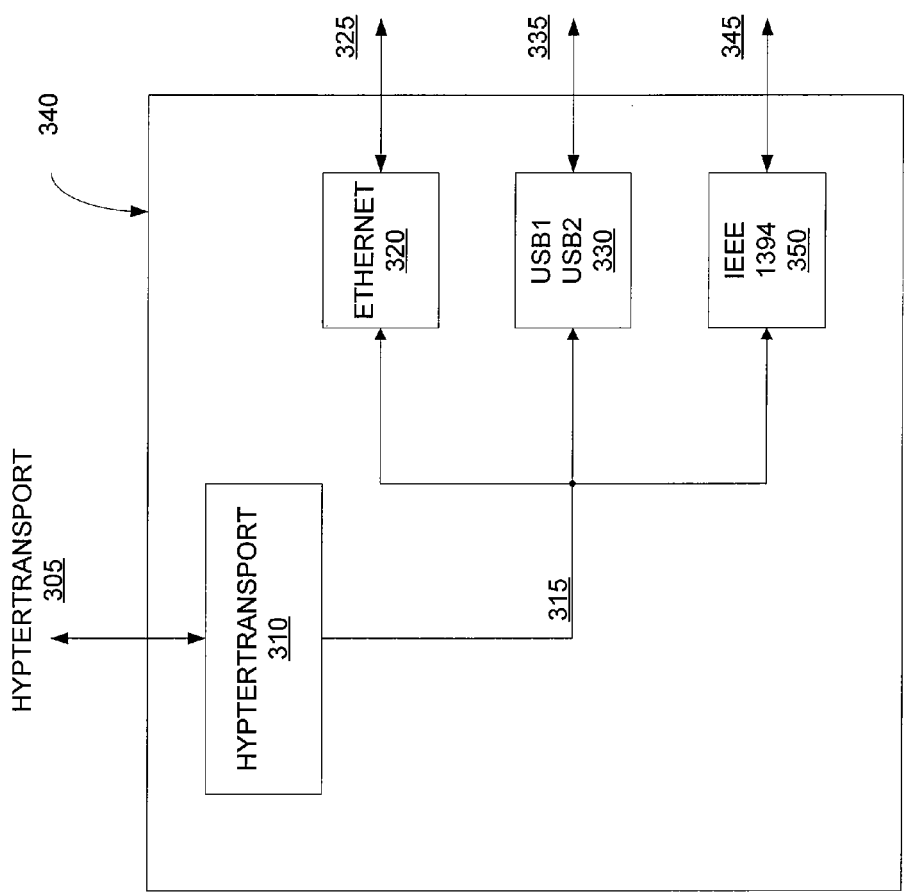

FIG. 3A is a block diagram of a Southbridge circuit that may be used as the Southbridge 140 in FIG. 1, or as a Southbridge in other embodiments of the present invention. Included are a Hypertransport interface 310, Ethernet media access controller (MAC) 320, USB unit 330, and IEEE (1394) media access controller 350.

The Hypertransport interface 310 may be a fast Hypertransport interface communicating with the Northbridge over a Hypertransport channel 305. The Hypertransport interface 310 provides a signal path 315 over which it communicates with the various units and media access controllers. The Ethernet MAC 320 provides one or more ports 325, the USB unit 330 provides one or more ports 335, and the IEEE (1394) MAC 350 provides one or more ports 355.

The USB unit 330 further includes one or more host controllers. Alternately the Southbridge 340 may include multiple USB units, each including one or more one or more host controllers. The host controllers communicate with one or more devices on a USB bus. The host controller also provides such overhead functions as a start of frame signal, which is sent onto the bus once each frame. The host controllers pass memory read requests to the CPU via the PC interface 310.

Figure 3B:
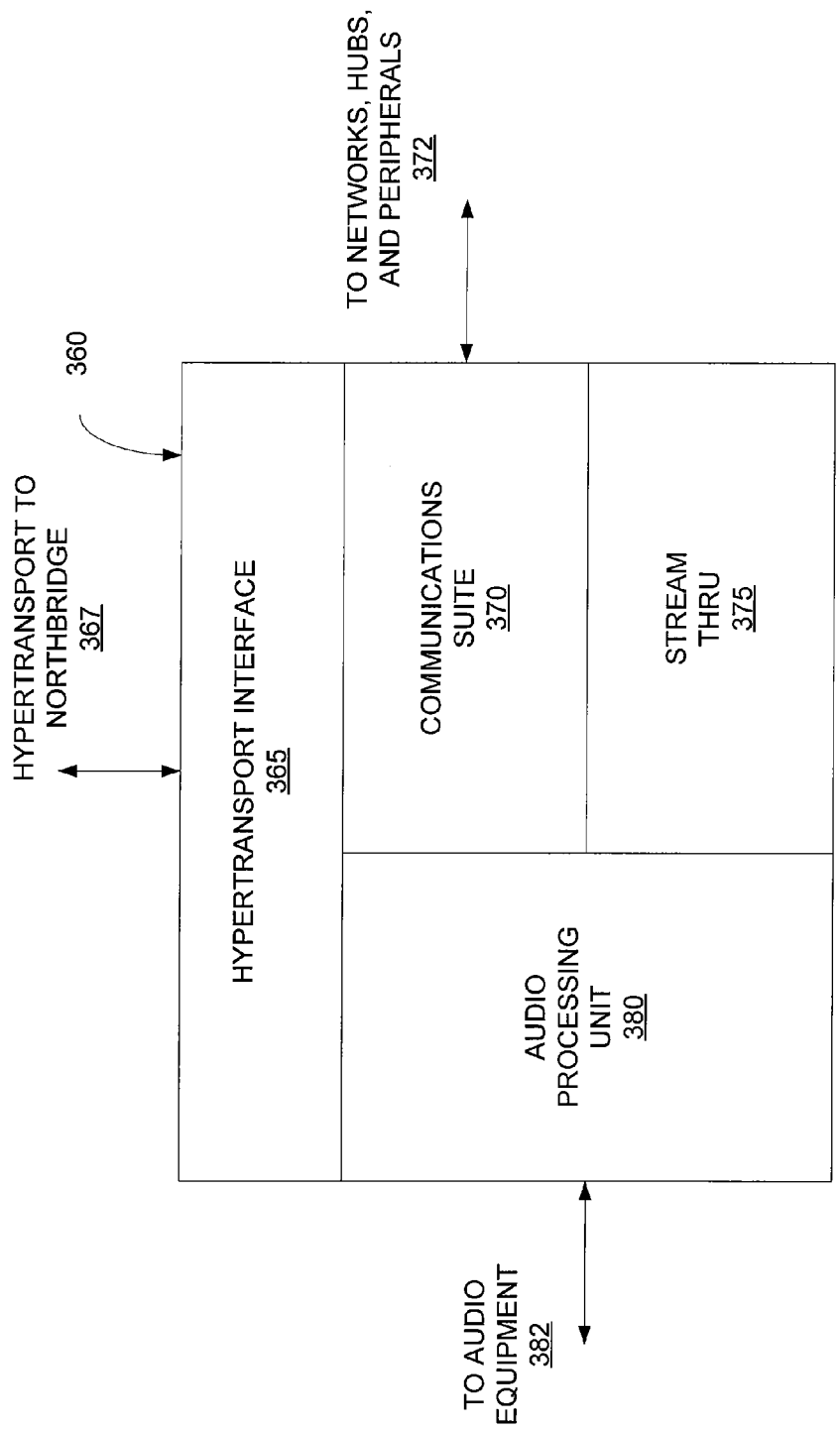
FIG. 3B illustrates an nForce MCP that incorporates an embodiment of the present invention.

FIG. 3B illustrates an nForce MCP that incorporates an embodiment of the present invention. Included on the nForce MCP are a Hypertransport interface circuit 365, communications suite 370, StreamThru™ circuitry 375, and audio processing unit (APU) 380.

The communications suite 370 includes circuitry such as one or more USB host interface circuits that selectively communicate with external devices via one or more USB ports. The communications suite 370 typically also includes an Ethernet MAC, IEEE 1394, and potentially other networking circuits.

The Southbridge 340 and nForce MCP 360 may each be formed on an integrated circuit, or they may be formed on more than one integrated circuit. Alternately, the Southbridge 340 or nForce MCP 360 may be combined, possibly with still other circuits, on a single integrated circuit.

The USB host controllers in the Southbridge 340 or nForce MCP 360 send and receive data in the form of packets to and from the USB devices or hubs. Data packets to be sent to devices are scheduled, that is, they are placed in linked lists of packets to be transmitted. Packets are sent during time intervals of 1 ms—this time period is referred to as a frame. Each frame is further subdivided into eight microframes, each 125 us in duration.

These data packets are organized into one of two lists or schedules. Data packets on these lists are sent during each microframe. These lists are referred to as the periodic schedule and the async schedule. The periodic schedule is organized as a binary tree that is traversed from the leaf to root, where the leaf level is the same for 8 consecutive microframes and incremented each frame. The periodic list provides an isochronous data transfer. Applications requiring a guaranteed bandwidth are placed on the periodic schedule, for example, data, audio, telephony, mice or other pointing devices, and other applications. The periodic schedule is traversed once the beginning at the start of each microframe.

The async schedule is organized as a round-robin loop that is traversed as many times as possible following the periodic schedule, but before the end of a microframe. The async schedule provides an asynchronous data transfer and is useful for such devices as hard drives, printers, and scanners.

Figure 4:
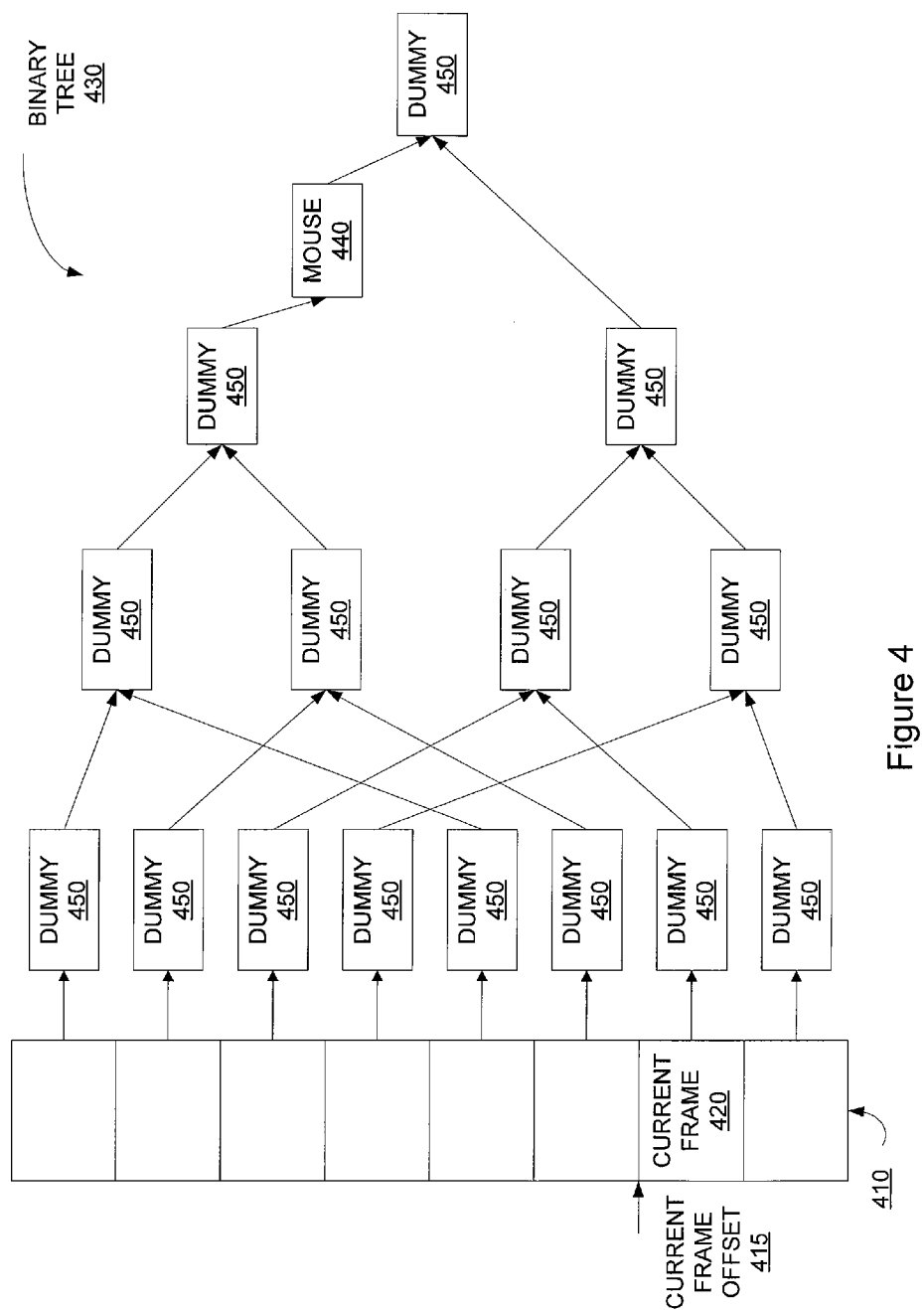
FIG. 4 is a symbolic representation of a periodic schedule that may be used by embodiments of the present invention.

FIG. 4 is a symbolic representation of a periodic schedule that may be used by embodiments of the present invention. Included are a periodic frame list 410, binary tree 430, one actual transfer descriptor 440 (for a mouse), and dummy transfer descriptors 450. More details regarding these transfer descriptors and their handling can be found in U.S. patent application Ser. No. 10/640,762, titled "Segregated Caching in Linked Lists for USB," filed Aug. 13, 2003, by Berendsen, which is incorporated by reference.

The periodic frame list 410 is a list of starting points. The current frame offset 420 indicates the leaf in the binary tree 430 where the current traversal will begin. At the start of each frame, the current frame offset 420 is incremented by one space. From the indicated leaf, the periodic schedule is traversed to the root. To prevent shuffling of pointers as devices or endpoints are added and removed, dummy descriptors 450 are placed at each node in the binary tree 430 and descriptors for which work is to be done are inserted between these dummy descriptors 450. In this specific example, there is work to be done at only one node 440; this work is for the mouse, and its descriptor 440 is inserted between two dummy descriptors 450. Using this tree structure, some applications may receive guaranteed bandwidth each microframe, every second microframe, every fourth microframe, and so on. In this example, the mouse will be queried for an update during one-half of all frames.

Figure 5:
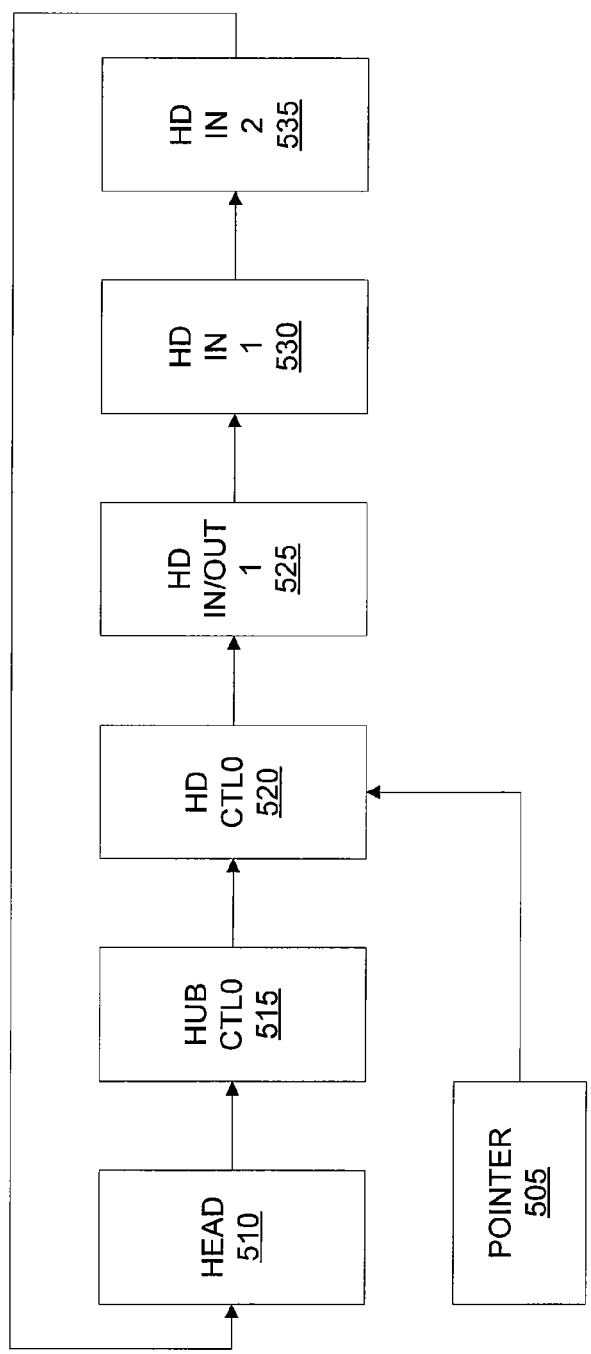
FIG. 5 is a symbolic representation of an asynchronous schedule that may be used by an embodiment of the present invention.

FIG. 5 is a symbolic representation of an async schedule that may be used by an embodiment of the present invention. Included are pointer 505, followed by transfer descriptors 510, 515, 520, 525, 530, and 535.

During each microframe, following the traversal of the periodic schedule, the async schedule is traversed as many times as possible until the end of the microframe. The async schedule is arranged in a round-robin fashion, wherein the traversal begins with the transfer descriptor following the transfer descriptor processed last in the previous microframe. For example, if transfer descriptor 515 was the last transfer descriptor processed in a microframe, during the next microframe, the async schedule is traversed beginning with transfer descriptor 520.

Again, devices, functions, or endpoints such as a mouse, operate as slave devices on a universal serial bus. As such, they do not initiate communications with a host controller, rather, the host controller pings or queries them on a regular basis dictated by the schedules discussed above. Each time the USB host controller requests information from the device, it first reads the above schedules which include information regarding that device from the system memory. Similarly, once it requests and receives information from the device, it may be necessary to write new information back to the system memory.

As an example, before a host controller requests information from a mouse, it needs to read information from the system memory regarding the mouse. This information includes, in one example, a bus address for the mouse and protocol information used in accessing the mouse. A request for this information is sent to the central processing unit, which in turn reads it from a system memory and provides it to the universal serial bus host controller. The USB host controller uses this information to ask the mouse if it has been moved. Position information, if any, is then written back to the system memory via the same path. This data flow is shown in the following figures.

Figure 6A:
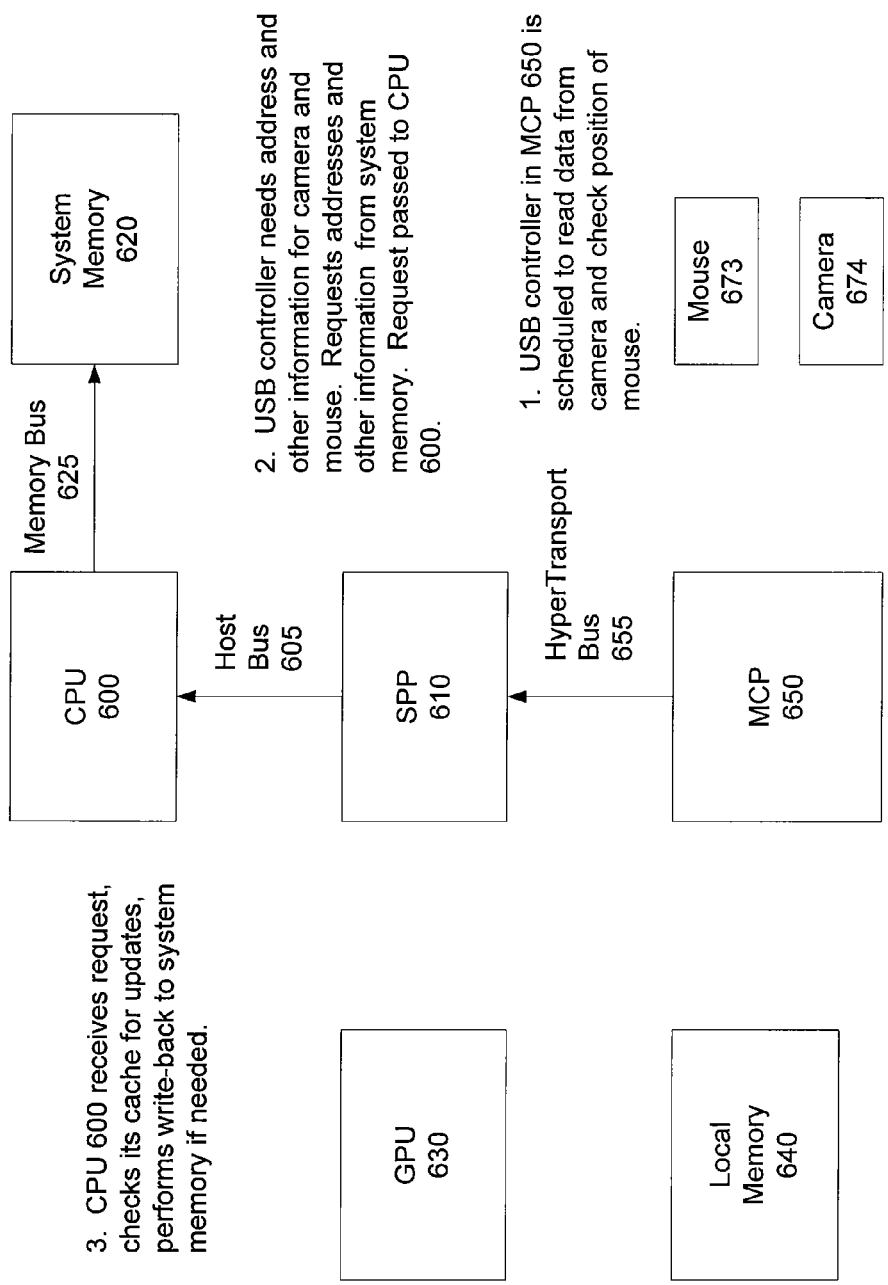
FIGS. 6A-C illustrate a flow of data in a computer system that is improved by an embodiment of the present invention.
Figure 6B:
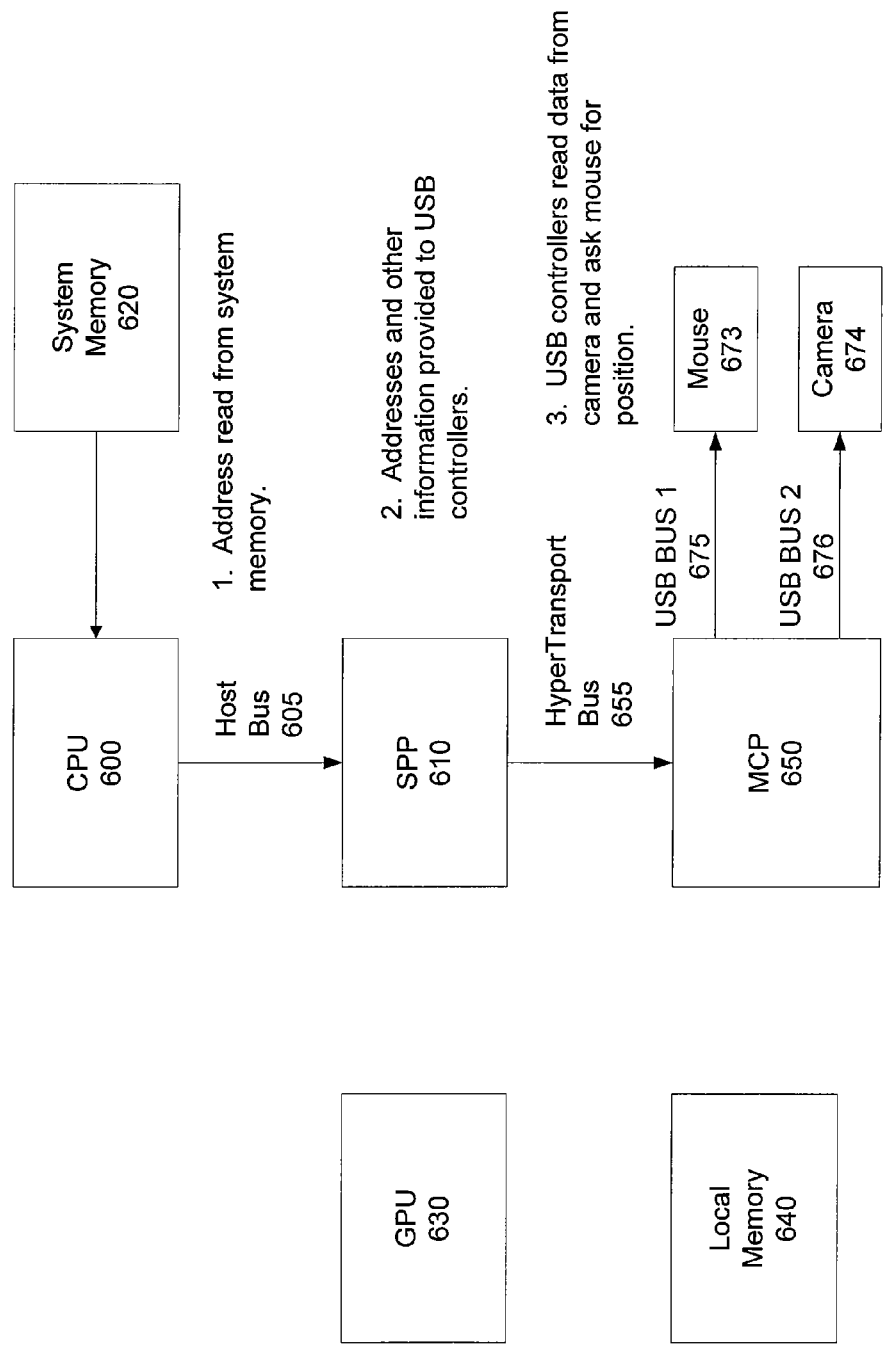
Figure 6C:
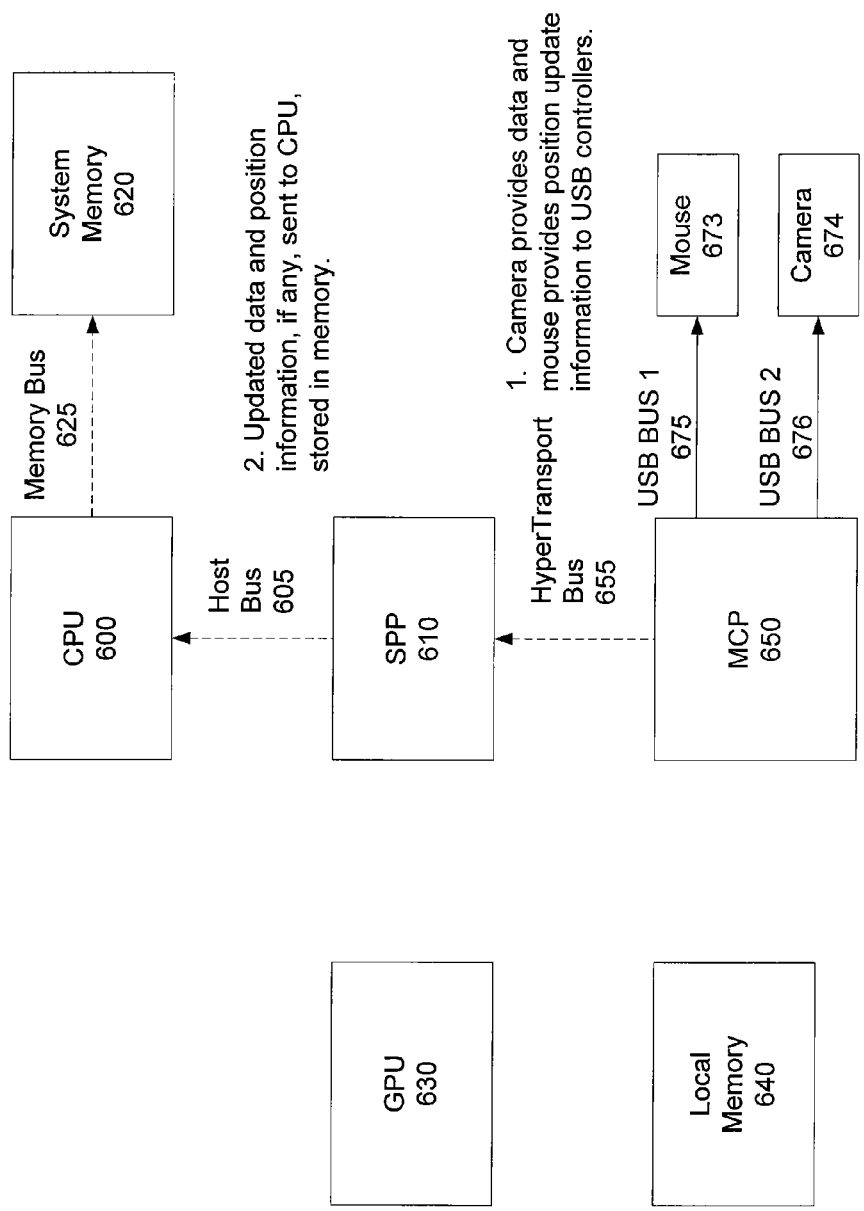

FIGS. 6A-C illustrate a flow of data in a computer system that is improved by an embodiment of the present invention. In FIG. 6A, USB host controllers in an MCP 650 are scheduled to request information from mouse 673 regarding changes in its position and to read data from a camera 674. Accordingly, the USB controllers need bus addresses for the mouse and camera, as well as other information regarding these devices. This information is requested from the central processing unit 600. The request is passed to the CPU 600 via the system platform processor 610.

In various embodiments of the present invention, these addresses and other information are cached on the CPU 600. When this is the case, the CPU 600 checks its cache to see if the information has been updated and responds with the requested information. If this information is not cached, the CPU 600 reads the information from the system memory 620.

In FIG. 6B, the addresses and other information are provided to the USB controllers, again via the system platform processor 610. One USB controller can then ask the mouse 672 for an update in its position, while another reads data from the camera 674. If the mouse has not been moved, it may reply with an acknowledgment. This acknowledgment means that it has received the inquiry but has no information to return, that is, it has not been moved since the last inquiry.

In FIG. 6C, if there has been a change in the mouse position, this information is returned to the USB controller, which then provides it to the CPU 600. The CPU caches it and write it to the system memory 620 as appropriate. The camera also provides data which is cached and written to the system memory 620 as appropriate.

Again, each time the CPU is in a low-power or sleep mode and needs to write or read data to or from its cache or system memory, the CPU leaves the low-power or sleep mode and enters a higher power dissipation node. This is particularly undesirable in battery-powered devices, since entering this mode reduces battery life. An example of the power increases caused by these transactions is shown in the following figure.

Figure 7:
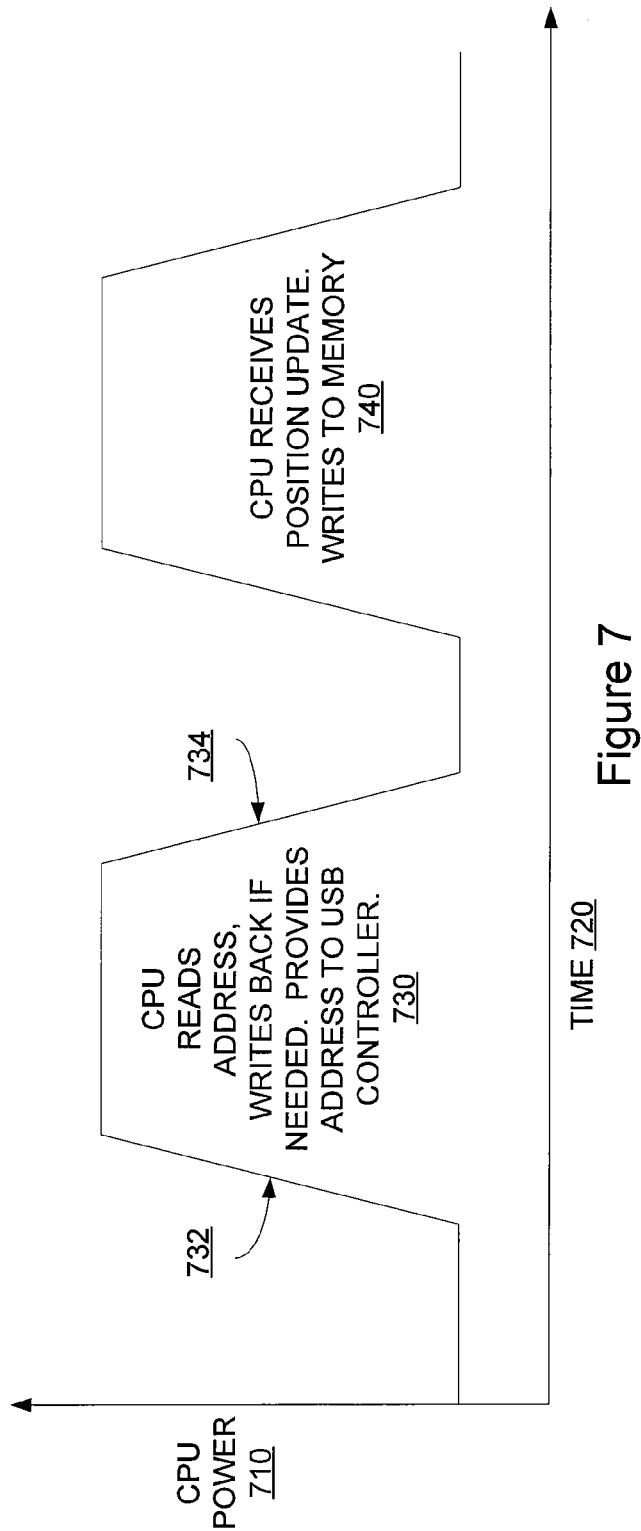
FIG. 7 illustrates an increase in CPU power dissipation when various activities are initiated by a USB host controller.

FIG. 7 illustrates an increase in CPU power dissipation when various activities are initiated by a USB host controller. The CPU power 710 is plotted as a function of time 720. In this example, a USB host controller is scheduled, among other tasks, to query a mouse regarding its position. The USB host controller requests address and other information from the CPU. Accordingly, the CPU reads the address and other information from memory or cache and initiates a write-back if needed. This information is then provided to USB controller. This activity causes CPU power 710 to increase, as shown by rising edge 732. The power dissipation stays high as pulse 730 while the CPU performs these tasks.

Once the CPU has completed this task, it may return to low-power state, as shown by falling edge 734. At a later time, the CPU may receive a position update for the mouse from the USB host controller. This may result in a separate increase in power 740. Alternately, the increases in power 730 and 740 may merge into one such increase. That is, the two pulses shown may merge into one. Also, as described above, there may be no new information to write to memory, and pulse 740 may not occur.

In various embodiments of the present invention, address and other information for the devices on a bus to be accessed during a frame is requested at the start of the frame. In other embodiments, information may be requested at other times, for example at the start of one or more microframes.

Typically, separate host controller drivers may be used to control various host control interface circuits such as a Southbridge or media communications processor. For example, a first driver may control an EHCI, while a second driver controls an OHCI or UHCI. When bus activity is initiated, these drivers send start commands to their respective host control interfaces. These start commands are conventionally sent asynchronously. Accordingly, multiple host controller interface circuits also typically operate asynchronously. An example is shown in the following figure.

Figure 8:
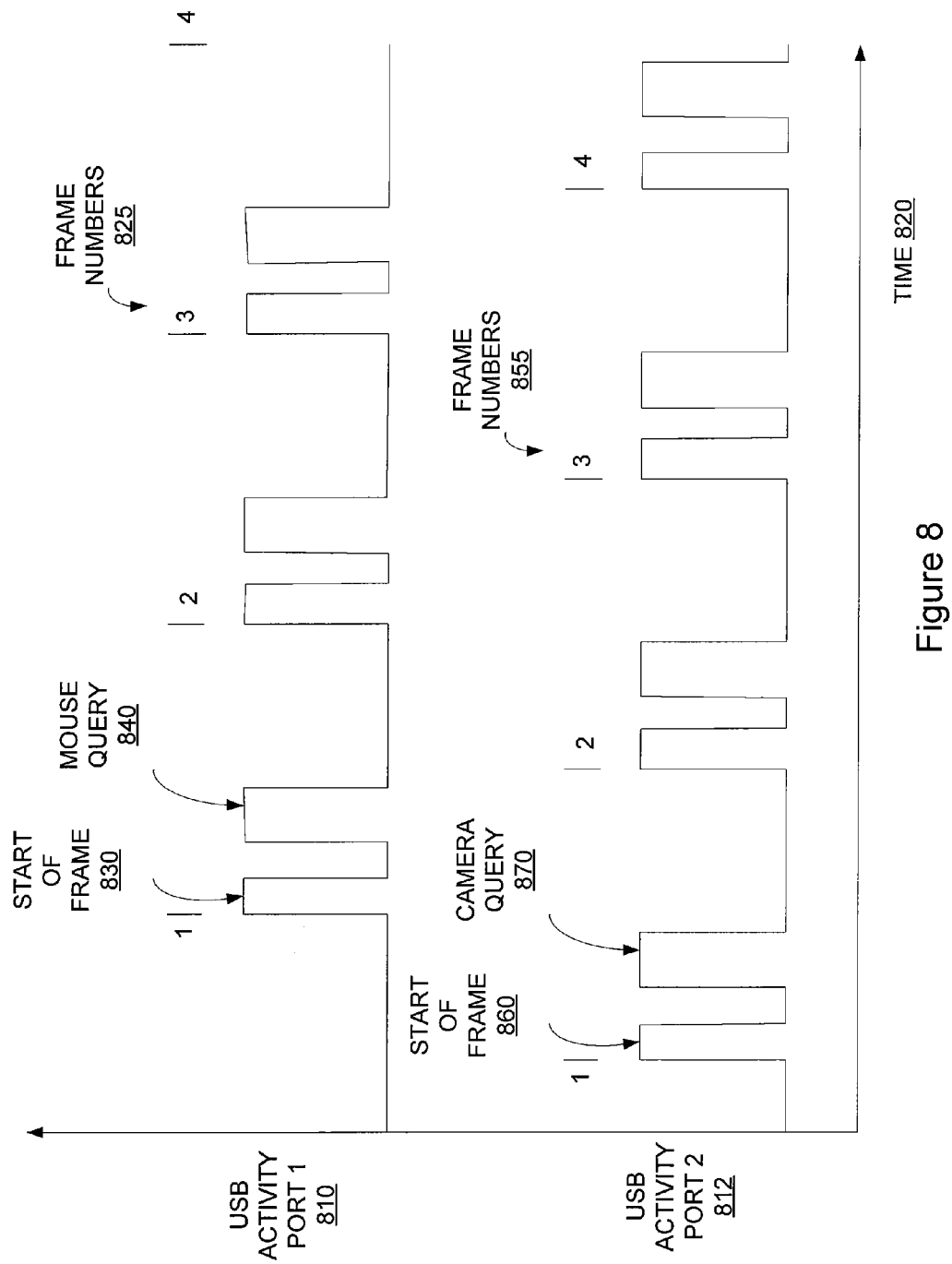
FIG. 8 illustrates bus activity at two USB ports.

FIG. 8 illustrates bus activity at two USB ports. Included is activity at a first port, port 1 810, and a second port, port 2 812. In this specific example, a mouse is connected to the first port, while a camera is connected to the second port. These devices may operate at different speeds, for example the mouse may operate at a lower USB1 rates, while the camera may operate at the higher USB2 rate. Activity for frames 825 is shown for port 1 810 and activity for frames 855 is shown for port 2 812.

Activity on port 1 810 includes a start a frame signal 830 and a mouse query 840. Activity on port 2 812 includes a start of frame signal 860, followed by a query of the camera 870. In this example, the mouse and camera are queried each frame 825, though often these devices are queried less often.

Again, each device query causes a memory read to be initiated. If a CPU is in a low power state when this memory read is received, the CPU exits the lower power state, performs the read operation, and returns the low-power mode. Again, data written in response to the device query may either lengthen or initiate another exit from the low-power state for the CPU. An example of this is shown in the following figure.

Figure 9:
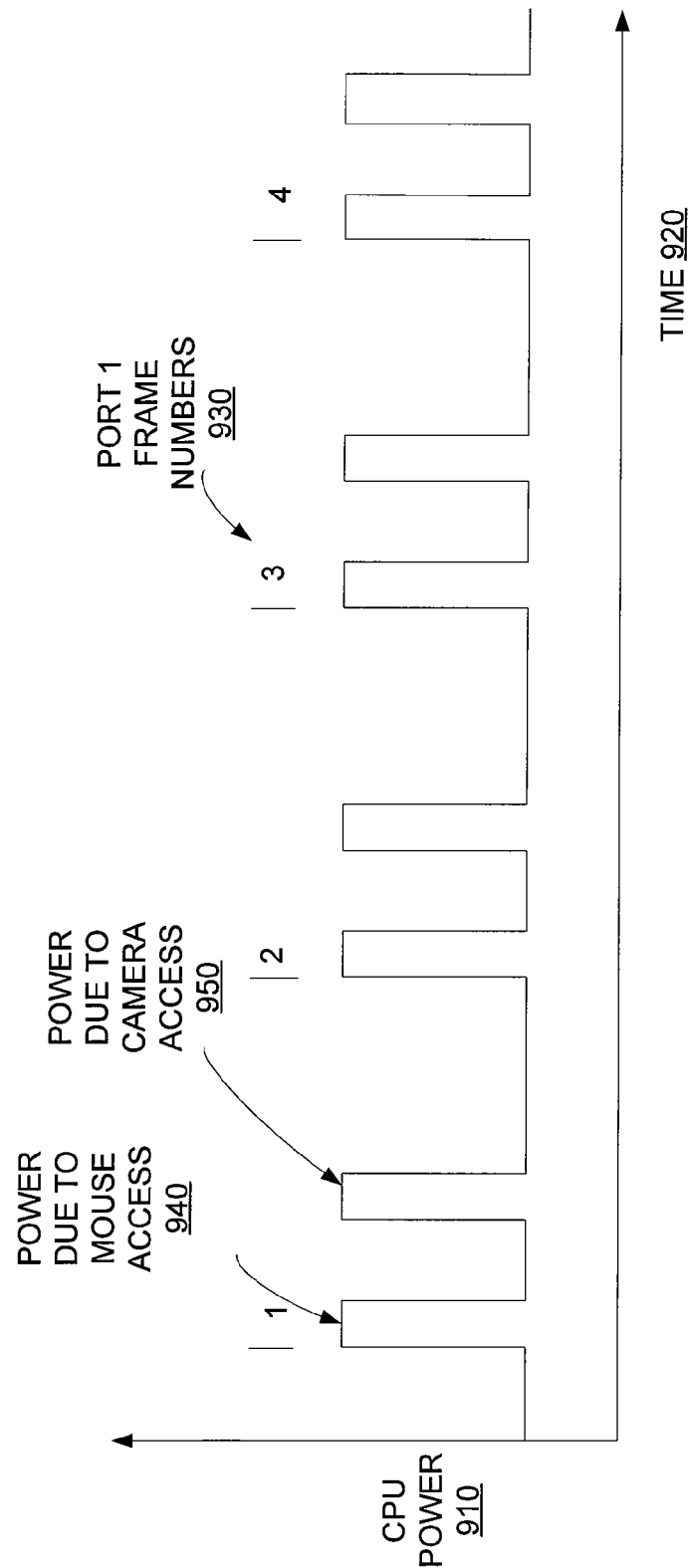
FIG. 9 illustrates changes in CPU power due to memory accesses initiated by USB traffic on two buses.

FIG. 9 illustrates changes in CPU power due to memory accesses initiated by USB traffic on two buses. In this figure, CPU power 910 is plotted as a function of time 920. Time is shown in terms of port 1 frames 930. As can be seen, during each frame time, the CPU power 910 cycles twice, once to read data for the mouse on port 1, and once for data for the camera on port 2. In a system with more than two ports, this situation is further exacerbated. That is, the CPU power is cycled even more often.

On occasion, due to random circumstance, memory activity initiated by a first host controller may align with the memory activity initiated by a second host controller. In this case, the pulses 940 and 950 may align. This may result in a reduction in CPU power consumption. However, this fortuitous circumstance cannot be relied upon to be reproducible.

Accordingly, embodiments of the present invention reduce power consumed during these transactions by synchronizing the frame timing used by host controller interfaces. This may be accomplished by sharing a frame count or other timing signal among the host controller interface circuits.

In one specific embodiment of the present invention, a first host control interface circuit generates a timing signal indicative of the frame timing used by that host controller interface. This timing signal is shared with other host controller interface circuits. The other host controller interface circuits receive this timing signal and generate frame timings such that their frames are substantially synchronous with the first host controller interface's frames. In this way, when the host controller interfaces read data from memory, these memory accesses are substantially aligned such that resulting power consumption is minimized.

In various embodiments of the present invention, power consumption is further reduced by having the host controller interface circuits essentially skip, that is, not access the memory at all during some frames. In a specific embodiment of the present invention, the host controller interfaces read and traverse their schedules only one frame in every 32 frames. Under some circumstances, this allows a CPU to remain in the low-power state for a proximately 32 ms. Further details can be found in co-owned and co-pending U.S. patent application Ser. No. 11/613,845, titled "Reducing System Power Consumption Due to USB Host Controllers," by Berendsen et al, which is hereby incorporated by reference.

In one such embodiment of the present invention, a first host controller interface circuit provides a number of LSBs of a frame count signal to the other host controller interface circuits. For example, where the schedules are traversed once in every 32 frames, the first host controller interface provides the five LSBs of its frame count to the other host controller interface circuits. As the other host controller interface circuits receive start commands from their host controller interface drivers, they wait until the received frame count LSBs match the LSBs of their internal frame counter. When these counts match, the other host controller interface circuits begin counting frames and generating bus traffic. An example is shown in the following figure.

Figure 10:
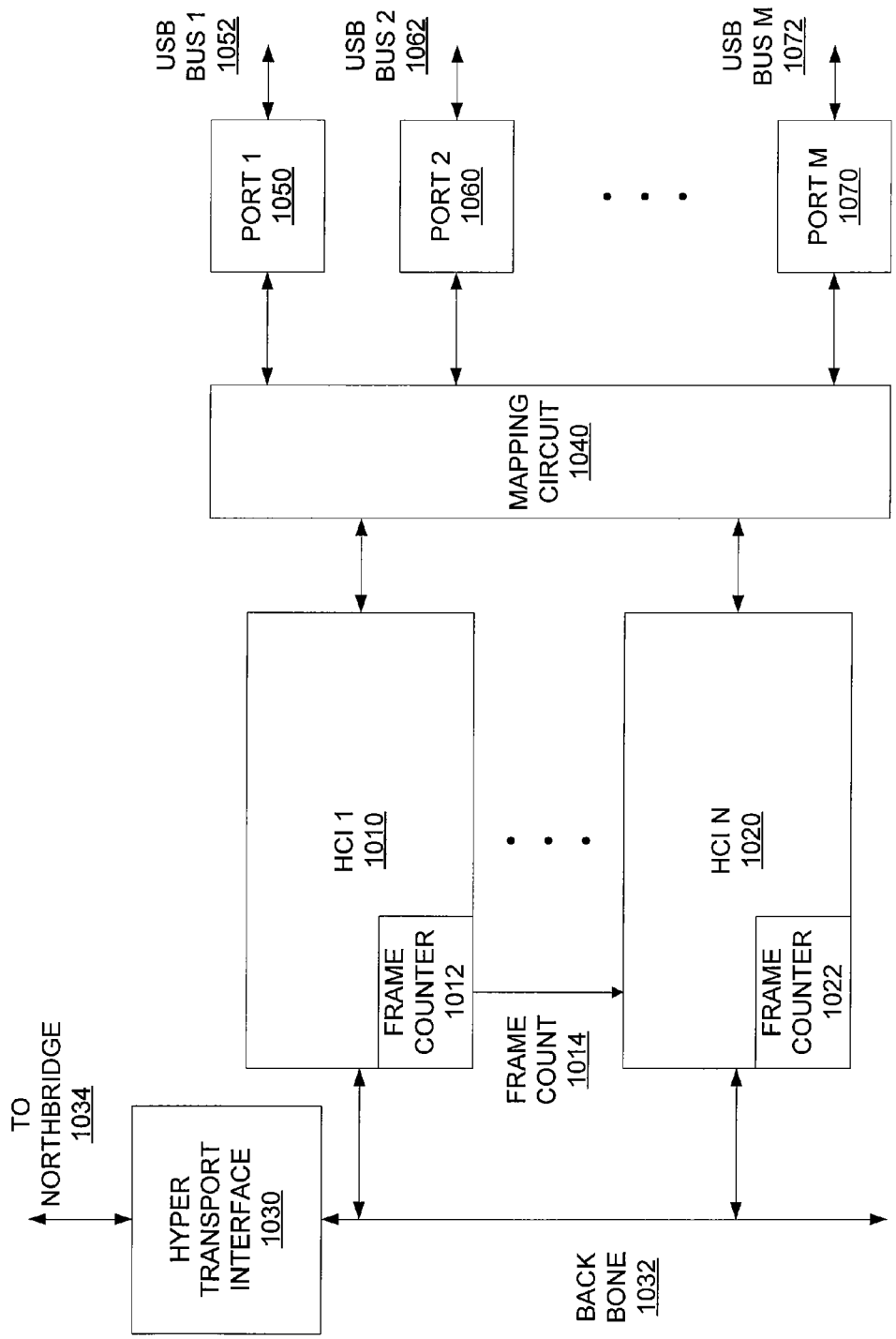
FIG. 10 is a block diagram of a number of host controller interface circuits communicating with a number of USB ports according to an embodiment of the present invention.

FIG. 10 is a block diagram of a number of host controller interface circuits communicating with a number of USB ports according to an embodiment of the present invention. This circuitry may be included on a Southbridge, media communications processor, or other appropriate integrated circuit. This figure includes a number of host controller interface circuits 1010 through 1020, a HyperTransport interface circuit 1030, mapping circuit 1040, and ports 1 1050 through M 1070.

Host controller interface circuits 1010 through 1020 may be EHCI, UHCI, or OHCI circuits. The mapping circuit 1040 maps or multiplexes the host controller interface circuits 1010 through 1020 to the ports 1050 through 1070. In various embodiments of the present invention, each host controller interface circuit may map to zero, one, or more ports. The host controller interface circuits interact with a CPU and system memory via the HyperTransport interface 1030.

In this embodiment of the present invention, a frame counter 1012 in host control interface 1 1010 provides one or more bits of a frame count or other appropriate timing signal on line 1014 to the other host control interface circuits. The other host control interface circuits use this frame count or other timing signal to align their frame timing to frame timing generated by host controller interface 1 1010. In this way, frame timing at ports 1050 through 1070 are substantially aligned. Since these frames are substantially aligned, memory requests made via the HyperTransport interface 1030 are temporally clustered. Again, this clustering allows the CPU to possibly remain in a low-power state for longer periods of time, thereby reducing its power consumption. An example of this is shown in the following series of figures.

Figure 11A:
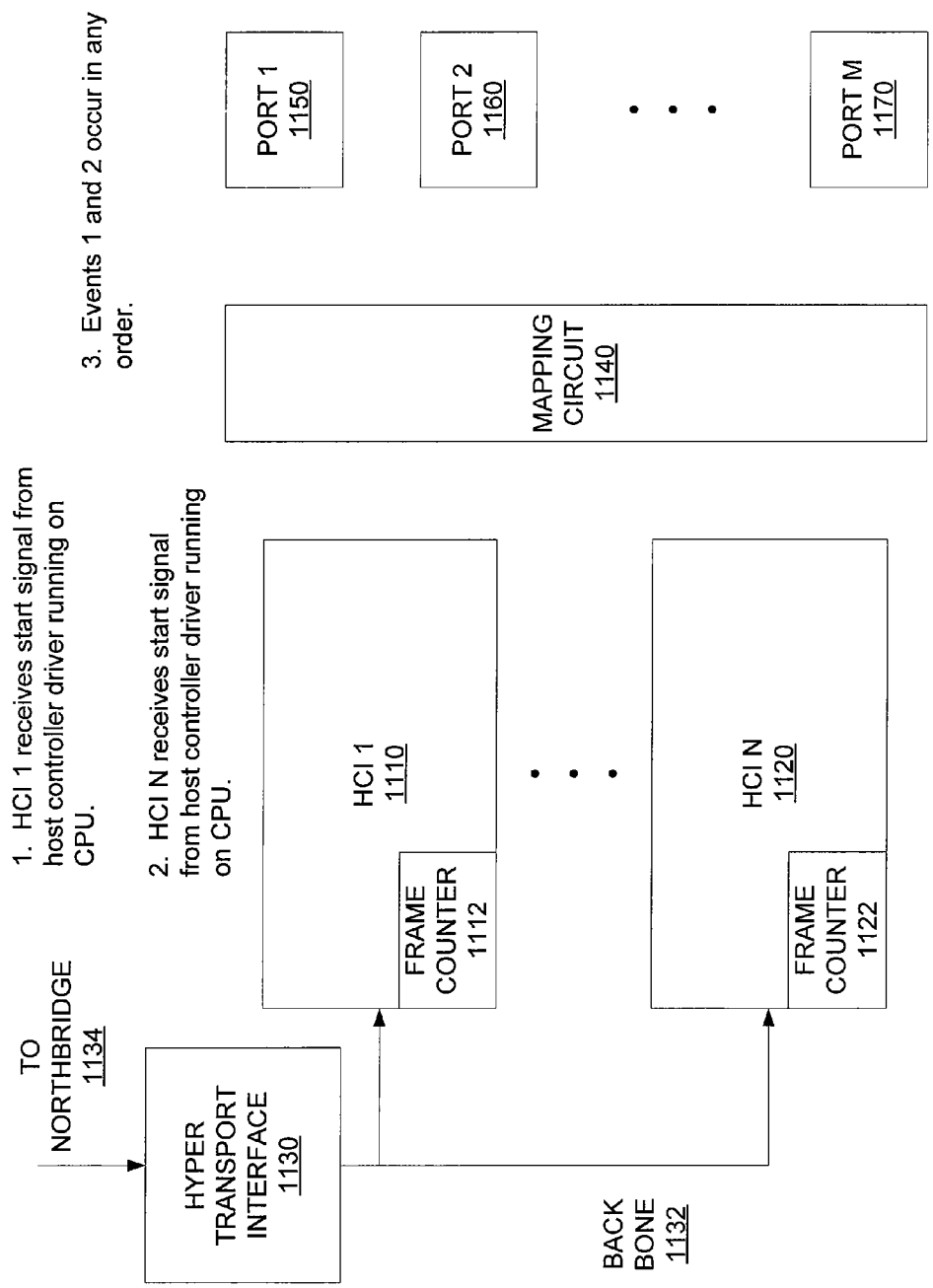
FIGS. 11A-C illustrate data flow among a number of host controller interface circuits according to an embodiment of the present invention.
Figure 11B:
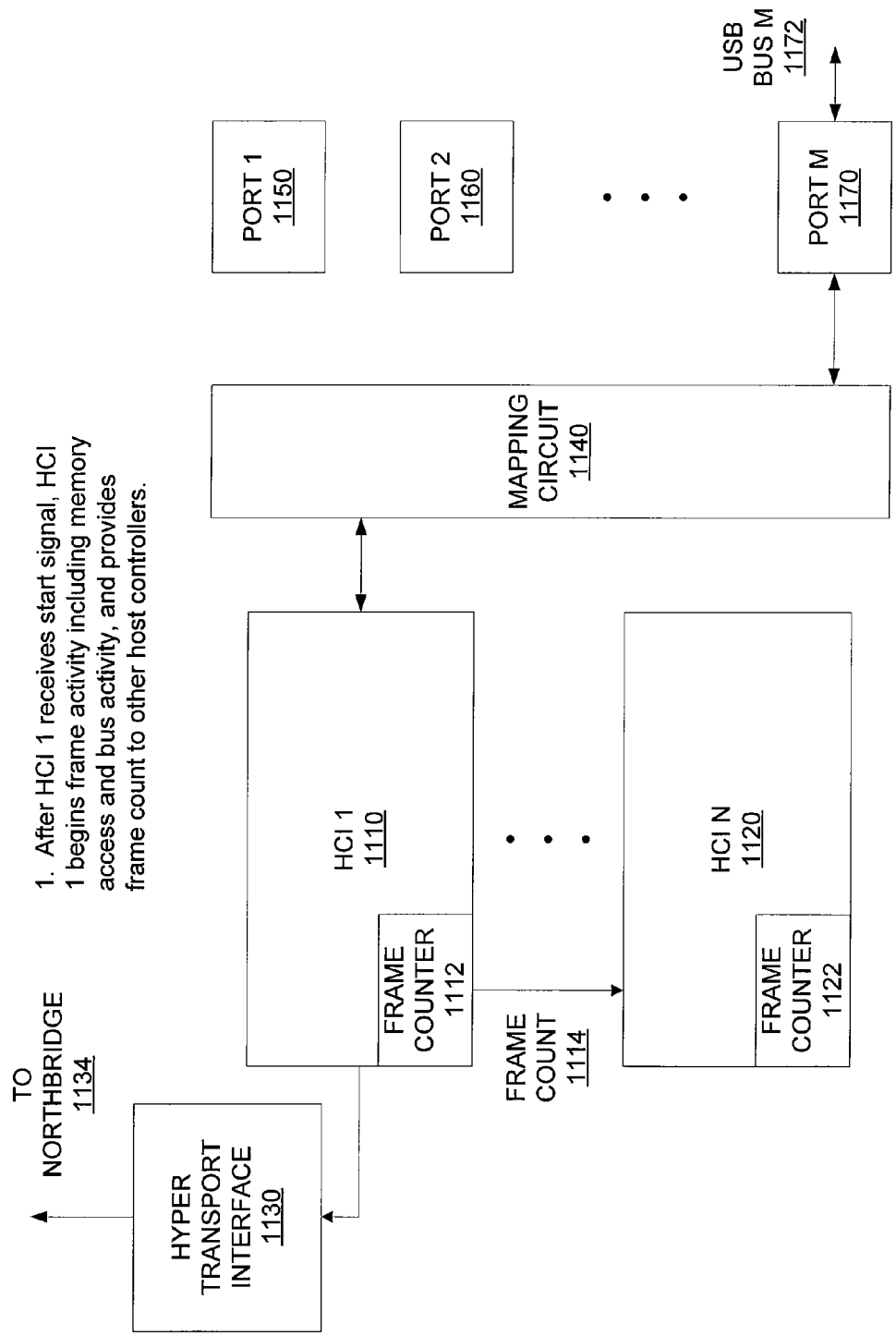
Figure 11C:
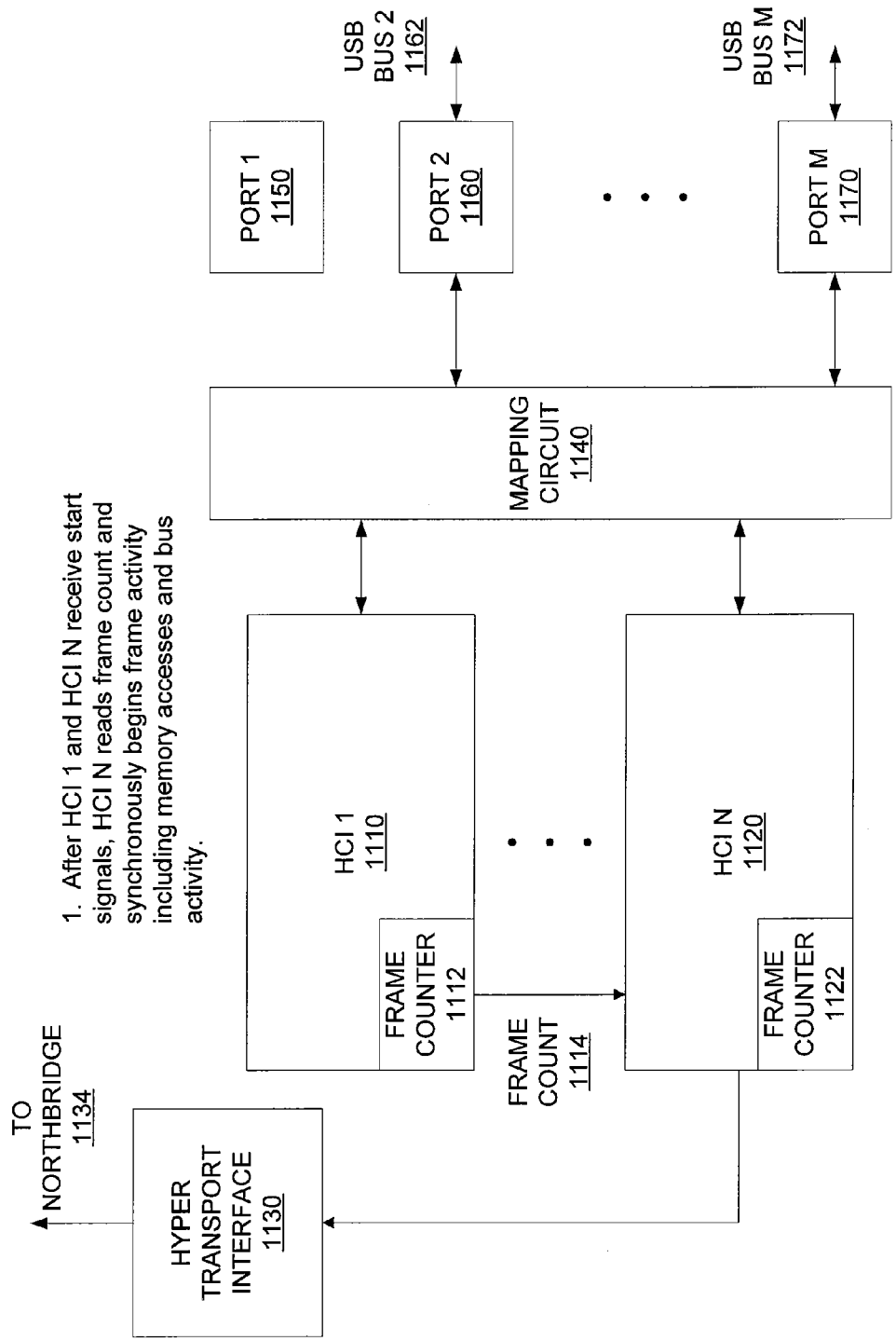

FIGS. 11A-C illustrate data flow among a number of host controller interface circuits according to an embodiment of the present invention. In FIG. 11A, the first host controller interface 1 1010 receives a start command from its host controller driver running on a CPU. Specifically, it receives this command via the HyperTransport interface 1030, which in turn receives it from a Northbridge, system platform processor, or other appropriate intermediary. In a specific embodiment of the present invention, this command is a CPU write to the host controller's PCI memory mapped registers. Also, the host controller interface N 1120 receives a start command. These start commands may have any timing relationship. For example, host controller interface 1 1010 may receive its start command before host controller interface N 1120, host controller interface N 1120 may receive its start command before host controller interface 1 1110, or they may receive their start commands at substantially the same time.

In FIG. 11B, after host controller interface 1 1010 receives its start command, but independently of when host controller interface N 1120 receives its start command, host controller interface 1 1010 begins frame activity including memory accesses and bus activity, and provides one or more bits of its frame count to the other host controller interfaces. In this specific example, host controller interface 1 1110 maps to port M 1170. Host controller 11110 provides memory requests via the HyperTransport interface 1130.

In FIG. 11C, after host controller interface 1 1010 and host controller interface N 1020 have received start commands, host controller interface N 1020 reads the bits of the frame count provided by host controller interface 1 1110, and compares them to bits of the frame count provided by its own frame counter 1122. When the frame count bits match, host controller interface N 1120 begins counting frames, and conducting activity on its ports with a frame timing that is substantially aligned to the frame timing for host controller interface 1 1110. In this specific example, host controller interface N 1120 maps to port 2 1160.

Again, in various embodiments of the present invention, multiple host controller interface align their frame timing such that memory accesses performed by the host controllers are temporally clustered. These accesses may then be made every frame, or at a reduced rate, that is, less than every frame. A flowchart illustrating a method of clustering memory accesses in each frame in a manner consistent with an embodiment of the present invention is shown in the following figure. A method according to an embodiment of the present invention where accesses are made at a reduced rate is shown in the subsequent figure.

Figure 12:
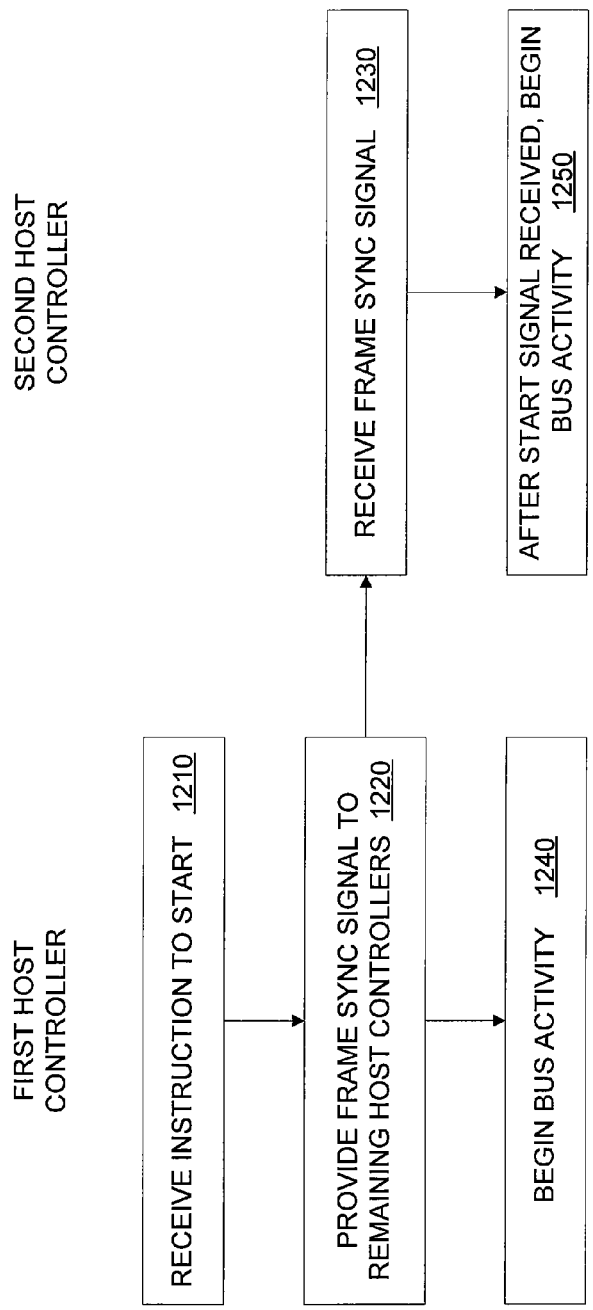
FIG. 12 is a flowchart illustrating a method of clustering memory accesses by host controller interfaces to reduce CPU power consumption according to an embodiment of the present invention.

FIG. 12 is a flowchart illustrating a method of clustering memory accesses by host controller interfaces to reduce CPU power consumption according to an embodiment of the present invention. In this figure, activities performed by a first host controller interface and a second host controller interface are listed in corresponding columns. In this figure, the first host controller interface provides a sync signal to the second host controller interface. This sync signal may be a frame count or other appropriate timing signal.

Specifically, in act 1210, a first host controller interface receives an instruction to start from its host controller interface driver. In act 1220, the first host controller interface provides a valid frame sync signal to the second host controller interface, and begins bus activity in act 1240.

In act 1230, the second host controller interface receives the frame sync signal from the first host controller interface. Once this frame sync signal is received, and after a start command is received from its host controller interface driver, bus activity begins in act 1250. It should be noted that this start command may come either before or after the frame sync signal is received in act 1230. Bus activity begins after both the start command and the valid frame sync signal from the first host controller are received.

Figure 13:
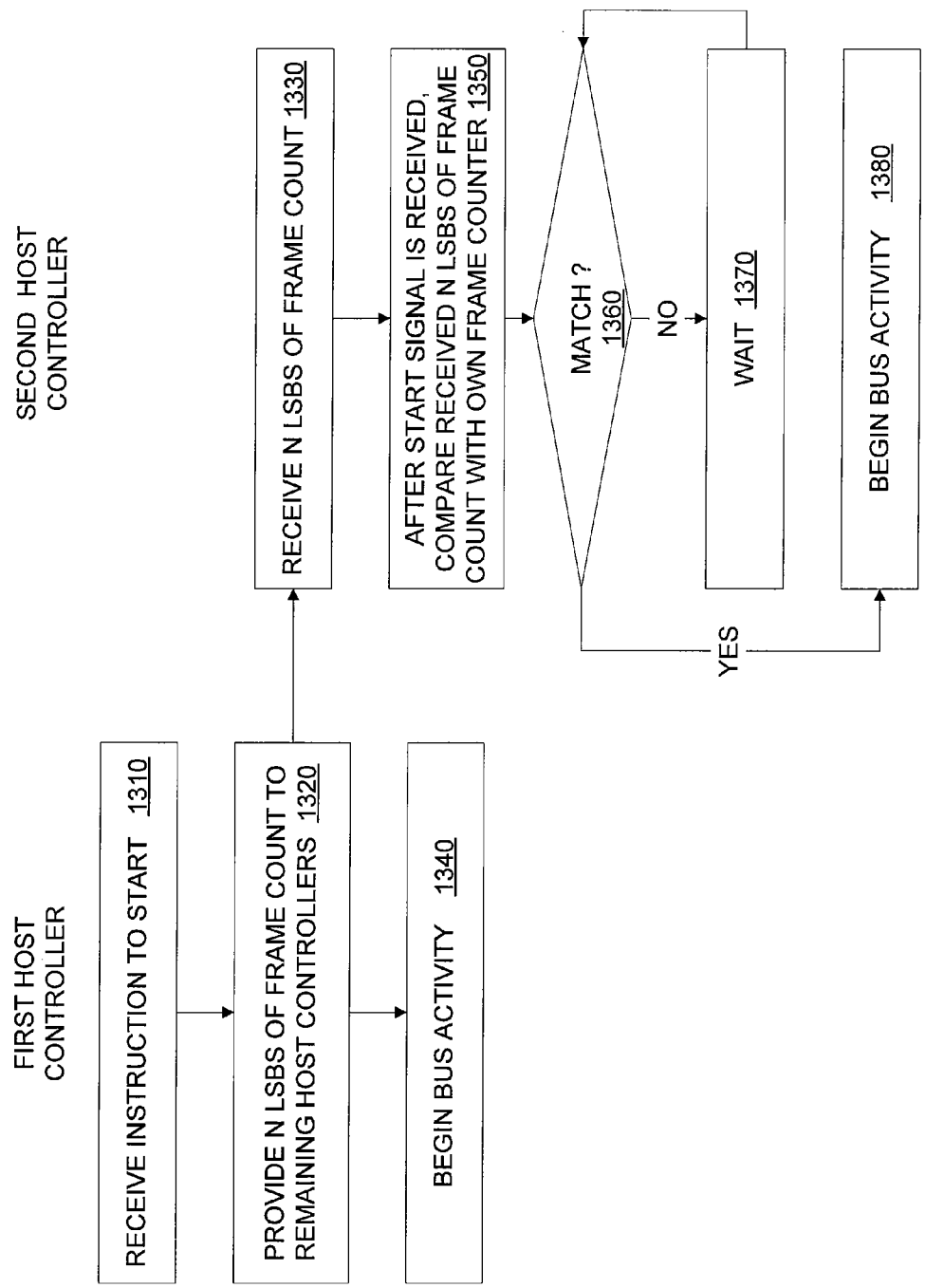
FIG. 13 is a flowchart illustrating another method of clustering memory accesses by host controllers to reduce CPU power consumption according to an embodiment of the present invention.

FIG. 13 is a flowchart illustrating another method of clustering memory accesses by host controllers to reduce CPU power consumption according to an embodiment of the present invention. Again, in this figure, activities performed by a first host controller interface and a second host controller interface are listed in corresponding columns. In this figure, the first host controller interface provides a frame count signal for the second host controller interface. This ensures multiple host controller interfaces access the memory during the same frame when memory accesses occur during only some frames.

Specifically, in act 1310, the first host controller interface receives an instruction to start. The first host controller interface then provides a number of LSBs of a frame count to the second host controller interface in act 1320. The first host controller interface begins bus activity in act 1340.

In act 1330, the second host controller interface receives the bits of the frame count. After receiving a start command from its host controller interface driver, the second host controller interface compares the received bits of the frame count with bits of its own frame count in act 1350. In act 1360, it is determined whether these bits match. If they do not, the second host controller waits in act 1370. If there is a match, bus activity begins in act 1380.

Again, the second host controller interface may receive its start command either before of after the first host controller receives its start command. Also, the frame count provided by the first host controller interface may be different from the internal count of the second host controller interface when it receives a start command. This can cause delays in the response of the second host controller interface to a start command. For example, at power up, both the first and second host controller interfaces may have a frame count that is reset to zero. The first host controller interface may receive its start command and begin counting frames. At this point, the second host controller interface may receive its start command, after which it has to wait a number of frames before there is a match in the bits of the frame count. In a specific embodiment where memory accesses occur in one of every thirty-two frames, this delay may be 32 ms.

A problem may arise if the driver providing the start command expects activity within this time period but does not detect such activity. In such case, the driver may generate an error condition and reset the host controller interface. For example, in a specific embodiment of the present invention, a driver may provide a start command by writing to the host controller's peripheral component interconnect (PCI) memory mapped registers. The driver may then obtain the status of the host controller by reading the PCI memory mapped registers. If the driver expects the host controller to be active, but instead obtains a status showing that the host controller is inactive, it may generate a reset command. If this is possible, care must be taken and either frames should not be skipped, or frames should be skipped at a reduced rate such that this error condition does not occur.

In a specific embodiment of the present invention, a capabilities structure (CAPS) is used to identify host controller interfaces that are being capable of skipping frames as outlined above. When the host controller driver reads this capability structure, it learns that a host controller is capable of skipping frames. The number of frames to be skipped is set in this specific embodiment of the present invention using a memory mapped register in the PCI register space. Once the host controller driver determines that the host controller has the capability of skipping frames, the driver determines how many frames to skip by reading these registers and then programs the host controller interface accordingly.

By sharing a frame timing or frame count signal, embodiments of the present invention provide timing that is substantially aligned for a number of buses. That is, the frame timing used for these buses is substantially aligned or synchronized. An example is shown the following figure.

Figure 14:
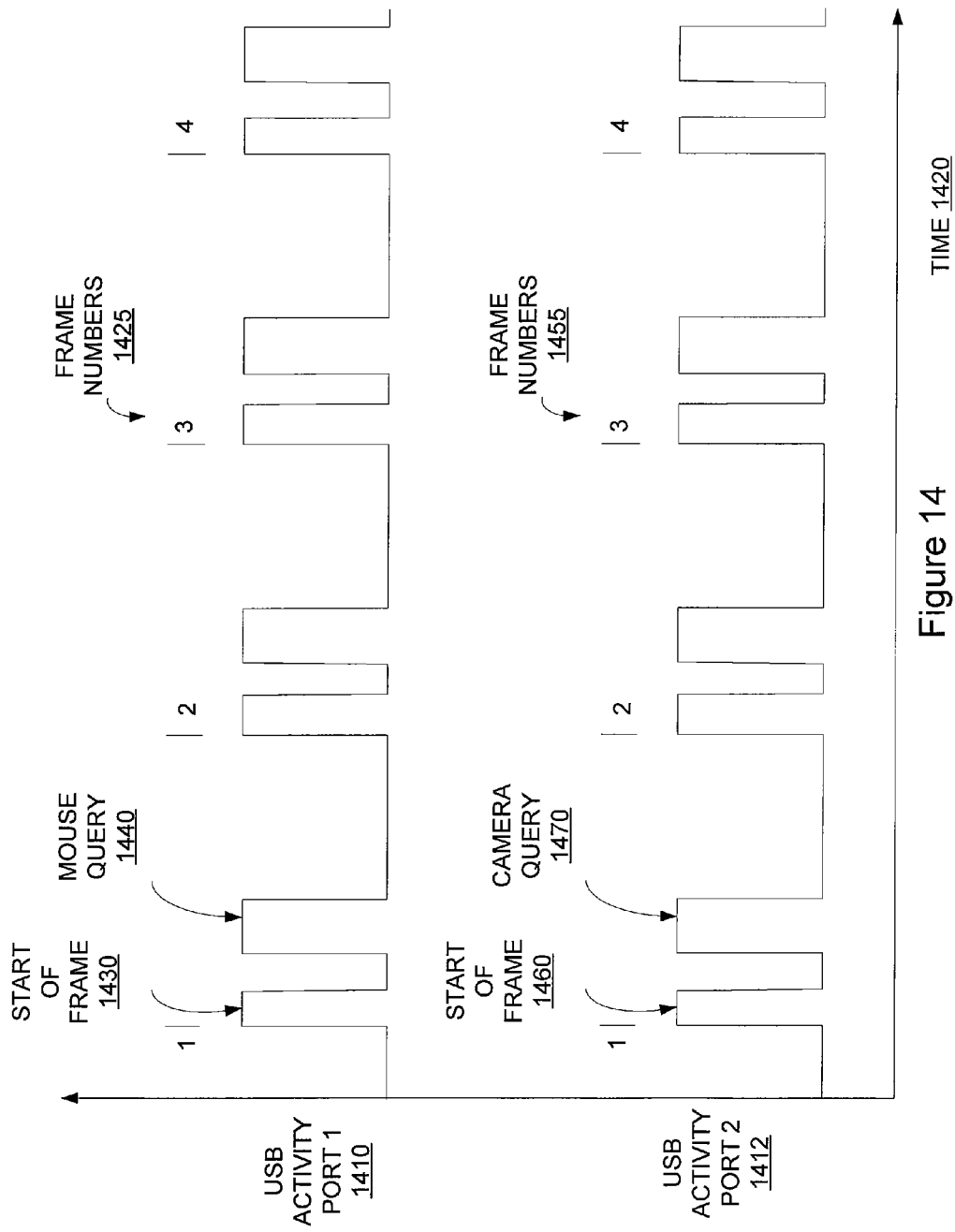
FIG. 14 illustrates bus activity at two ports according to an embodiment of the present invention.

FIG. 14 illustrates bus activity at two USB ports according to an embodiment of the present invention. This figure illustrates bus activity on ports 1 1410 and 2 1412. The activity on port 1 1410 includes start of frame signals 1430 and mouse queries 1440. These events occur each frame 1425. In more typical circumstances, the mouse may be queried only once in some number of frames, for example, one in four or one in eight frames, as dictated by a periodic schedule as shown above. The activity on port 2 1412 includes start of frame signals 1460 and camera queries 1470. Again, these occur, for exemplary purposes, once each frame 1455, though typically they are accessed only once in some number of frames.

This alignment of frames is possible even when different host controller interfaces, such as EHCI, UHCI, and OHCI are used, as they all have the same frame time, specifically one millisecond. However, it should be noted that some host controller drivers are able to make small corrections to the length of this frame. These corrections are typically stored in registers. Moreover, the incremental step sizes for corrections for these different standards are different. For example, OHCI drivers can make changes in increments of 80 ns, while the faster EHCI can be adjusted in increments of 16.6 ns. If the frame size for one host controller interface is varied with respect to another host controller interface's frame size, alignment would be lost and impossible to recover.

Thus, it is undesirable for independent corrections to be made to the frame sizes for different host controller interfaces that are employing an embodiment of the present invention. Accordingly, one embodiment of the present invention limits the registers used in frame size correction to a read-only function. That is, these registers can be read from, but they cannot be written to in order to change frame size.

Again, the result of the frame alignment provided by embodiments of the present invention is a clustering in resulting memory accesses. The clustering of memory accesses allows the CPU to possibly remain in a low power state for longer periods of time. An example is shown in the following figure.

Figure 15:
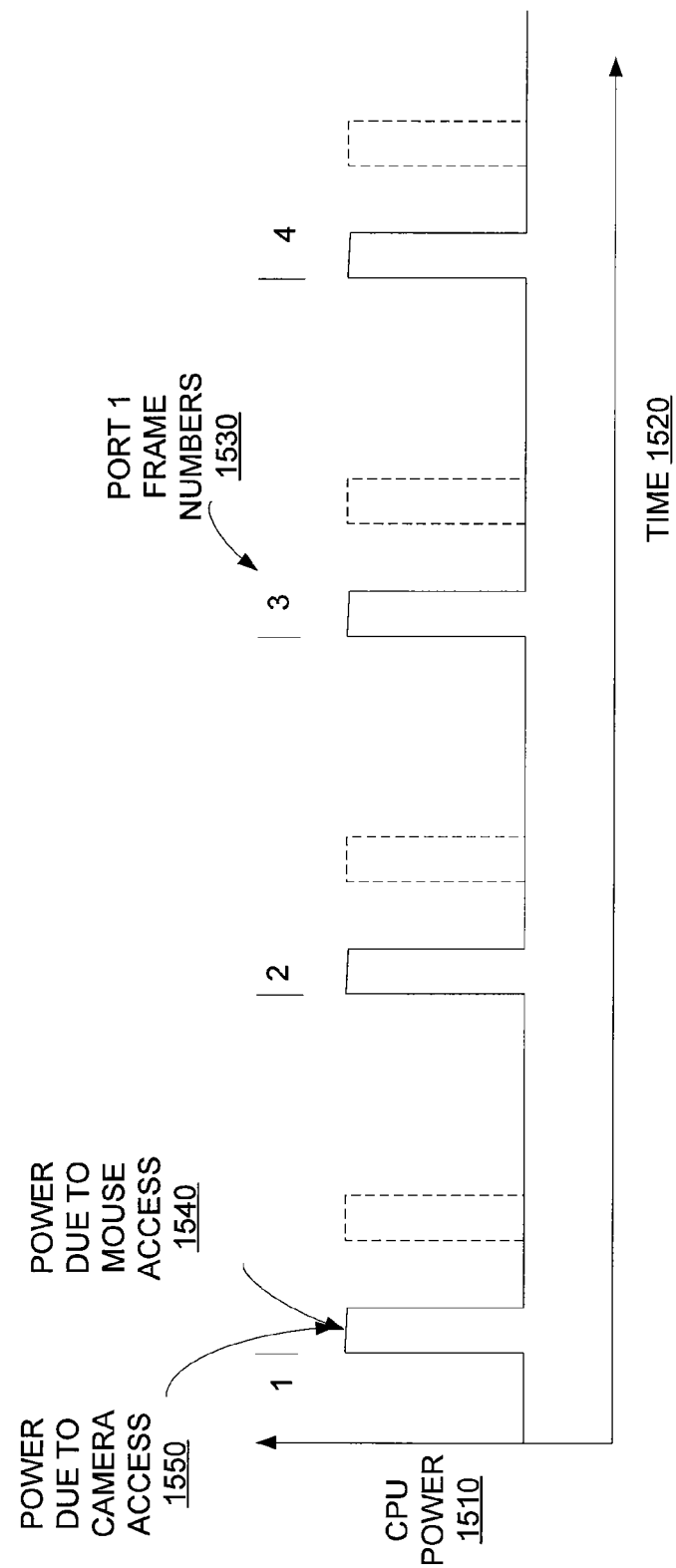
FIG. 15 illustrates changes in CPU power over time according to an embodiment of the present invention.

FIG. 15 illustrates changes in CPU power over time according to an embodiment of the present invention. Power increases due to memory accesses occur near the start of each frame 1530. In this example, power increases data memory accesses for a camera and mouse are shown to substantially overlapping. A second phantom power increase which occurred in FIG. 9 no longer occurs with the frames aligned, and is thus shown in dotted outline.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of controlling a plurality of buses comprising:
   with a first host controller interface:
      receiving a first start command;
      providing a frame-timing signal to a second host controller interface; and
      providing a first start of frame signal to a first bus; and
   with a second host controller interface:
      receiving a second start command;
      receiving the frame-timing signal from the first host controller interface; and
      based on the frame timing signal from the first host controller interface, providing a second start of frame signal to a second bus.

2. The method of claim 1 wherein the first bus is a universal serial bus.

3. The method of claim 2 further comprising:
   with the first host controller interface:
      requesting information from a memory regarding a first device on the first bus; and
   with the second host controller interface:
      requesting information from the memory regarding a second device on the second bus at a time substantially proximate to the request for information from the memory by the first host controller interface.

4. The method of claim 3 wherein the information regarding the first device on the first bus comprises:
   an address on the bus; and
   protocol information.

5. The method of claim 2 wherein the second start command is received by the second host controller before the first start command is received by the first host controller.

6. The method of claim 2 wherein the first host controller interface is a universal host controller interface.

7. The method of claim 2 wherein the first host controller interface is selected from the group consisting of a universal host controller interface, enhanced host controller interface, and open host controller interface.

8. An integrated circuit comprising:
a first host controller interface comprising:
a first frame counter providing a frame count output;
a second host controller interface comprising:
a frame count input coupled to the frame count output of the first frame counter;
a mapping circuit coupled to the first host controller interface and the second host controller interface;
a first bus port coupled to the mapping circuit;
a second bus port coupled to the mapping circuit; and
an interface circuit to provide memory read requests to a memory and to receive information from the memory, the interface circuit coupled to the first host controller interface and the second host controller interface.

9. The integrated circuit of claim 8 wherein the mapping circuit can couple either the first host controller interface or the second host controller interface to the first port.

10. The integrated circuit of claim 8 wherein the interface circuit provides the read requests to a Northbridge.

11. The integrated circuit of claim 8 wherein the information received from the memory includes a bus address and protocol information.

12. The integrated circuit of claim 8 wherein the first host controller interface is selected from the group consisting of a universal hot controller interface, enhanced host controller interface, and open host controller interface.

13. The integrated circuit of claim 8 wherein the integrated circuit is a Southbridge.

14. A method of controlling a plurality of buses comprising:
with a first host controller interface:
receiving a first start command;
providing a plurality of bits of a first frame count signal to a second host controller interface; and
providing a first start of frame signal to a first bus; and
with a second host controller interface:
receiving a second start command;
receiving the plurality of bits of the first frame count signal from the first host controller interface;
generating a second frame count signal;
comparing the plurality of bits of the first frame count signal to a plurality of bits of the second frame count signal; and
when the plurality of bits of the first frame count signal match the plurality of bits of the second frame count signal, providing a second start of frame signal to a second bus.

15. The method of claim 14 wherein the first bus is a universal serial bus.

16. The method of claim 15 further comprising:
with the first host controller interface:
requesting information from a memory regarding a first device on the first bus; and
with the second host controller interface:
requesting information from the memory regarding a second device on the second bus at a time substantially proximate to the request for information from the memory by the first host controller interface.

17. The method of claim 16 wherein the information regarding the first device on the first bus comprises:
an address on the bus; and
protocol information.

18. The method of claim 15 wherein the second start command is received by the second host controller before the first start command is received by the first host controller.

19. The method of claim 15 wherein the first host controller interface is a universal host controller interface.

20. The method of claim 15 wherein the first host controller interface is selected from the group consisting of a universal hot controller interface, enhanced host controller interface, and open host controller interface.

* * * * *